UNITED STATES PATENT OFFICE.

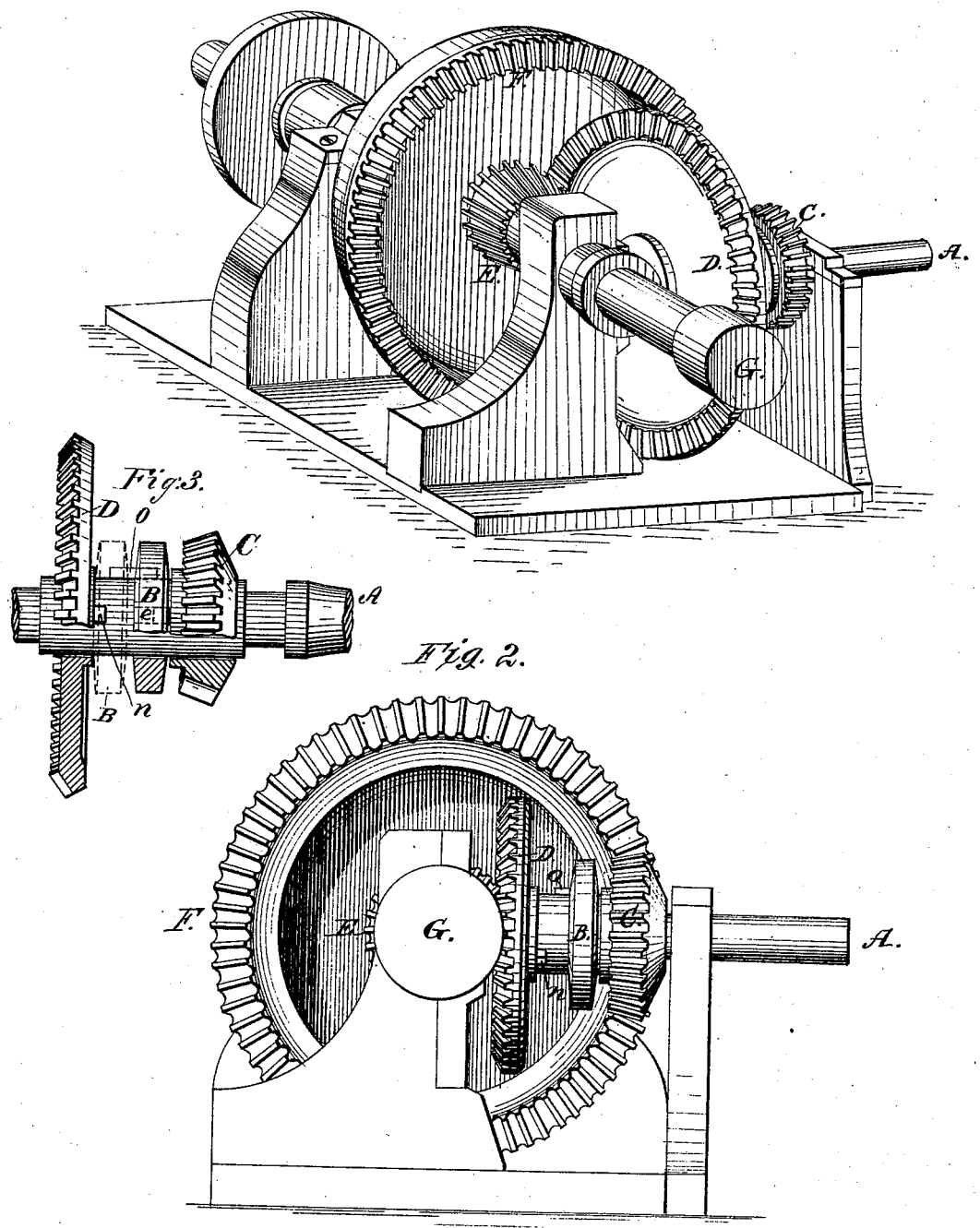

JOHN SMITH, OF PENSAUKEE, WISCONSIN.

IMPROVEMENT IN DOUBLE GEARING FOR POWER MACHINERY.

Specification forming part of Letters Patent No. 181,218, dated August 15, 1876; application filed March 29, 1875.

*To all whom it may concern:*

Be it known that I, JOHN SMITH, of Pensaukee, in Oconto county and State of Wisconsin, have invented a new and Improved Movement of Double Gearing for Hand or Power Machines; and I do hereby declare that the following is an exact and full description thereof, reference being had to the accompanying maps, and to the letters of reference marked thereon, making a part of this specification.

My invention consists in a novel construction and arrangement of gearing, whereby the speed can be changed at will without throwing the wheels out of gear, as hereinafter explained.

Figure 1 is a perspective view. Fig. 2 is a side elevation, and Fig. 3 is a sectional view of a portion detached.

It is often desirable in machinery to change the speed of the parts, and ordinarily this is accomplished by using gear of different sizes, so arranged that they can be thrown in or out of gear by moving the wheels on their shafts.

My invention has for its object the accomplishment of this result by means of gear-wheels so arranged that they need not be thrown out of gear, but will remain in gear and revolve continuously.

To accomplish this result I provide a shaft, G, on which is rigidly secured a crown-wheel, F, and a bevel-pinion, E, as shown in Figs. 1 and 2. At right angles to this shaft I mount another shaft, A, on which I mount loosely a bevel-wheel, D, which gears into the pinion E, and also a bevel-pinion, C, which engages with the crown-wheel F, as represented in Figs. 1 and 2. Upon the shaft A, between the wheels C and D, I place a collar or clutch, B, which is prevented from turning on the shaft by a spline or feather, O, as shown in Fig. 3, this clutch B being free to slide on the shaft A, as indicated by the dotted lines of Fig. 3. On each of the wheels C and D there are made two or more projections, *n*, which engage in corresponding recesses *e* in the sides of the collar B, so that when the collar or clutch B is shoved over and made to engage with either of said wheels, the wheel with which it is engaged is made to turn with the shaft A, it being fastened thereto for the time being by the clutch B.

It will be seen that whenever the wheel D is fastened by the clutch B the pinion C will be loose on the shaft, and when the pinion C is fastened by the clutch, the wheel D will be loose on the shaft, and consequently, while one is acting to transmit motion, the other remains in gear and revolves loosely on its shaft.

Either shaft may be used as the driving-shaft, there being of course a lever or other device arranged for shifting the clutch B on its shaft.

By using the concave wheel F room is afforded for the larger wheel D to work within it, and engage with the smaller pinion E, while the smaller pinion C on the shaft A engages with the crown-wheel F, the whole thus forming a very compact arrangement.

One advantage of this plan is, that as the wheels are always in gear, there is much less danger of breaking the cogs than in those where the wheels are thrown in and out of gear to change the speed.

Having thus described my invention, what I claim is—

The herein-described apparatus for changing the speed of machinery, the same consisting of the shaft G, having the concave wheel F mounted thereon, with the bevel-pinion E secured to said shaft within the concave wheel, in combination with the shaft A, arranged at right angles, and having mounted thereon loosely the bevel-wheels D and C, with the interposed clutch B, all as shown and described.

JOHN SMITH.

Witnesses:
JOHN C. NEVILLE,
C. N. KIES.